(12) United States Patent
Chou

(10) Patent No.: US 10,142,707 B2
(45) Date of Patent: Nov. 27, 2018

(54) SYSTEMS AND METHODS FOR VIDEO STREAMING BASED ON CONVERSION OF A TARGET KEY FRAME

(71) Applicant: CyberLink Corp., Shindian, Taipei (TW)

(72) Inventor: Chen-Wei Chou, New Taipei (TW)

(73) Assignee: CYBERLINK CORP., Shindian, Taipei (TW)

(*) Notice: Subject to any disclaimer, the term of this patent is extended or adjusted under 35 U.S.C. 154(b) by 0 days.

(21) Appl. No.: 15/441,362

(22) Filed: Feb. 24, 2017

(65) Prior Publication Data
US 2017/0251284 A1 Aug. 31, 2017

Related U.S. Application Data

(60) Provisional application No. 62/299,589, filed on Feb. 25, 2016.

(51) Int. Cl.
H04N 21/845 (2011.01)
H04N 21/472 (2011.01)
H04N 21/6371 (2011.01)
H04N 21/2387 (2011.01)
H04N 21/234 (2011.01)
H04N 21/414 (2011.01)

(52) U.S. Cl.
CPC ..... H04N 21/8455 (2013.01); H04N 21/2387 (2013.01); H04N 21/23418 (2013.01); H04N 21/41407 (2013.01); H04N 21/47217 (2013.01); H04N 21/6371 (2013.01)

(58) Field of Classification Search
None
See application file for complete search history.

(56) References Cited

U.S. PATENT DOCUMENTS

| 5,818,439 | A | * | 10/1998 | Nagasaka | G06F 17/30793 |
| | | | | | 348/E7.073 |
| 6,029,045 | A | * | 2/2000 | Picco | H04N 7/165 |
| | | | | | 348/E5.002 |
| 6,654,541 | B1 | * | 11/2003 | Nishi | H04N 21/654 |
| | | | | | 386/240 |
| 6,658,199 | B1 | * | 12/2003 | Hallberg | H04N 9/8042 |
| | | | | | 386/346 |

(Continued)

Primary Examiner — An Son P Huynh
(74) Attorney, Agent, or Firm — McClure, Qualey & Rodack, LLP

(57) ABSTRACT

In a computing device for streaming media content, information relating to a video bitstream is transmitted to a client device for displaying a user interface. An input signal is received from the client device indicating a desired start time in the video bitstream. Based on the start time, a target key frame is identified within the video, the target key frame comprising a nearest key frame in the video bitstream preceding the desired start time. A target frame header comprising a nearest header frame in the video preceding the target key frame is identified within the video bitstream. If necessary, the target key frame is converted to a first frame type. Only the target frame header, the target key frame, and video bitstream that follows the converted target key frame is sent to the client device, where the original frame referencing encoded in the video bitstream is utilized.

22 Claims, 7 Drawing Sheets

(56) References Cited

U.S. PATENT DOCUMENTS

| | | | | |
|---|---|---|---|---|
| 6,871,006 B1* | 3/2005 | Oguz | | G11B 27/031 348/E7.073 |
| 7,058,721 B1* | 6/2006 | Ellison | | G11B 27/031 348/E5.008 |
| 7,096,488 B1* | 8/2006 | Zhang | | H04N 21/23424 375/240.01 |
| 7,231,516 B1* | 6/2007 | Sparrell | | H04N 5/783 348/E7.056 |
| 7,986,867 B2* | 7/2011 | Gavin | | G06Q 30/06 369/47.1 |
| 9,565,476 B2* | 2/2017 | Bakke | | H04N 21/472 |
| 2001/0005400 A1* | 6/2001 | Tsujii | | G11B 27/11 375/240.29 |
| 2001/0017978 A1* | 8/2001 | Nagasawa | | G11B 20/10 386/329 |
| 2002/0028061 A1* | 3/2002 | Takeuchi | | H04N 19/587 386/248 |
| 2002/0051621 A1* | 5/2002 | Cuccia | | H04N 5/4401 386/356 |
| 2002/0144262 A1* | 10/2002 | Plotnick | | G11B 27/005 725/32 |
| 2002/0168175 A1* | 11/2002 | Green | | H04N 5/783 386/346 |
| 2003/0118243 A1* | 6/2003 | Sezer | | G06T 9/005 382/245 |
| 2004/0231004 A1* | 11/2004 | Seo | | H04N 7/17318 725/142 |
| 2007/0171973 A1* | 7/2007 | Kobayashi | | H04N 5/232 375/240.12 |
| 2008/0154941 A1* | 6/2008 | Park | | H04N 21/2343 |
| 2008/0212775 A1* | 9/2008 | Mirsky | | G11B 20/00086 380/210 |
| 2008/0267287 A1* | 10/2008 | Hannuksela | | H04N 21/4384 375/240.12 |
| 2008/0273698 A1* | 11/2008 | Manders | | H04N 5/783 380/200 |
| 2008/0317246 A1* | 12/2008 | Manders | | H04N 5/783 380/37 |
| 2009/0106807 A1* | 4/2009 | Suzuki | | H04N 21/23424 725/114 |
| 2009/0282444 A1* | 11/2009 | Laksono | | H04N 7/17336 725/89 |
| 2010/0050209 A1* | 2/2010 | Price | | H04N 5/4448 725/45 |
| 2010/0180011 A1* | 7/2010 | Sood | | G06F 15/16 709/219 |
| 2010/0290537 A1* | 11/2010 | Moriyoshi | | G11B 27/007 345/240.25 |
| 2011/0153858 A1* | 6/2011 | Bae | | H04N 7/17318 709/231 |
| 2011/0264676 A1* | 10/2011 | Belan | | G06F 17/30849 707/756 |
| 2011/0317771 A1* | 12/2011 | Chen | | G11B 27/007 375/240.25 |
| 2012/0008921 A1* | 1/2012 | Hattori | | G11B 27/034 386/248 |
| 2012/0147122 A1* | 6/2012 | Wan | | H04N 7/141 348/14.01 |
| 2012/0183042 A1* | 7/2012 | Kiran | | H04N 19/423 375/240.02 |
| 2012/0240174 A1* | 9/2012 | Rhyu | | H04N 21/643 725/109 |
| 2013/0003867 A1* | 1/2013 | Miki | | H04N 19/44 375/240.25 |
| 2013/0321364 A1* | 12/2013 | Chong | | G09G 3/3208 345/204 |
| 2014/0086326 A1* | 3/2014 | Dziecielewski | | H04N 19/70 375/240.16 |
| 2014/0105576 A1* | 4/2014 | Lou | | H04N 21/4302 386/241 |
| 2014/0376886 A1* | 12/2014 | Pettersson | | H04N 5/147 386/241 |
| 2015/0358382 A1 | 12/2015 | Chen et al. | | |
| 2017/0034538 A1* | 2/2017 | Lee | | H04N 19/172 |

* cited by examiner

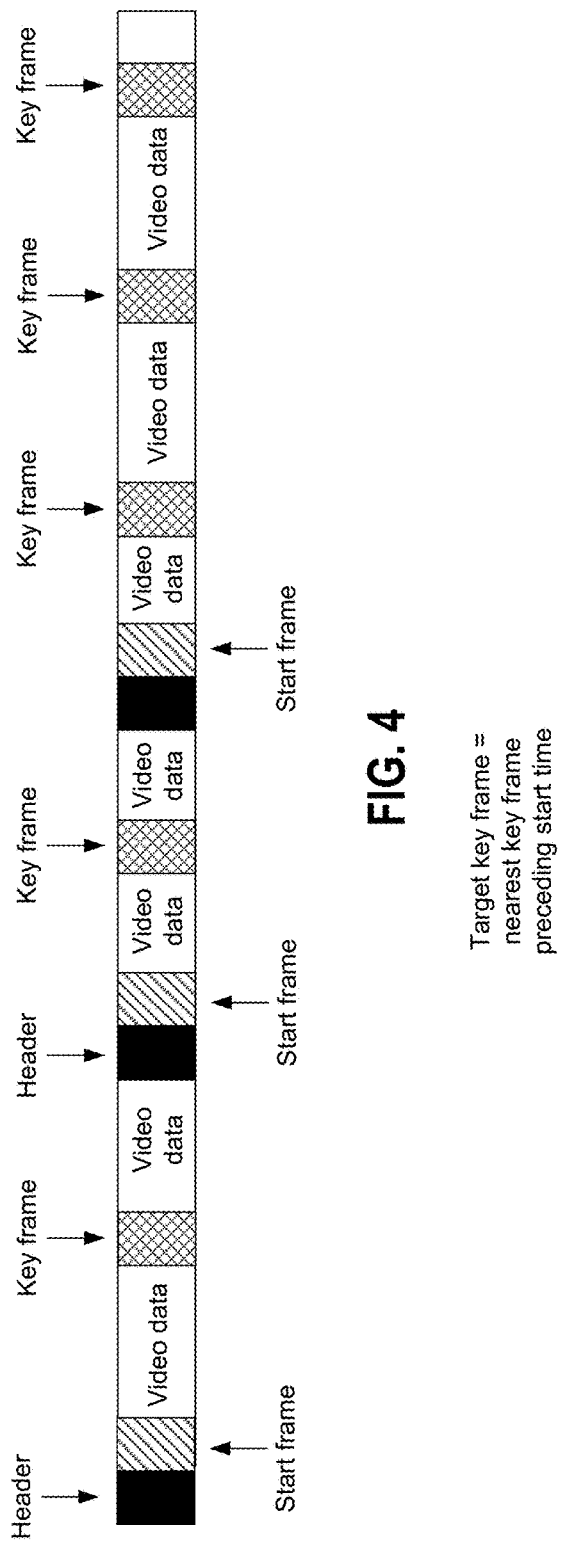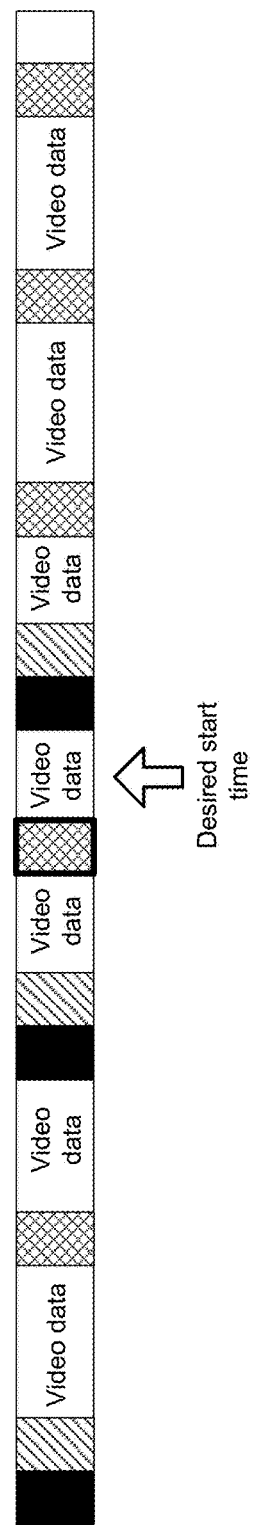
FIG. 4
FIG. 5

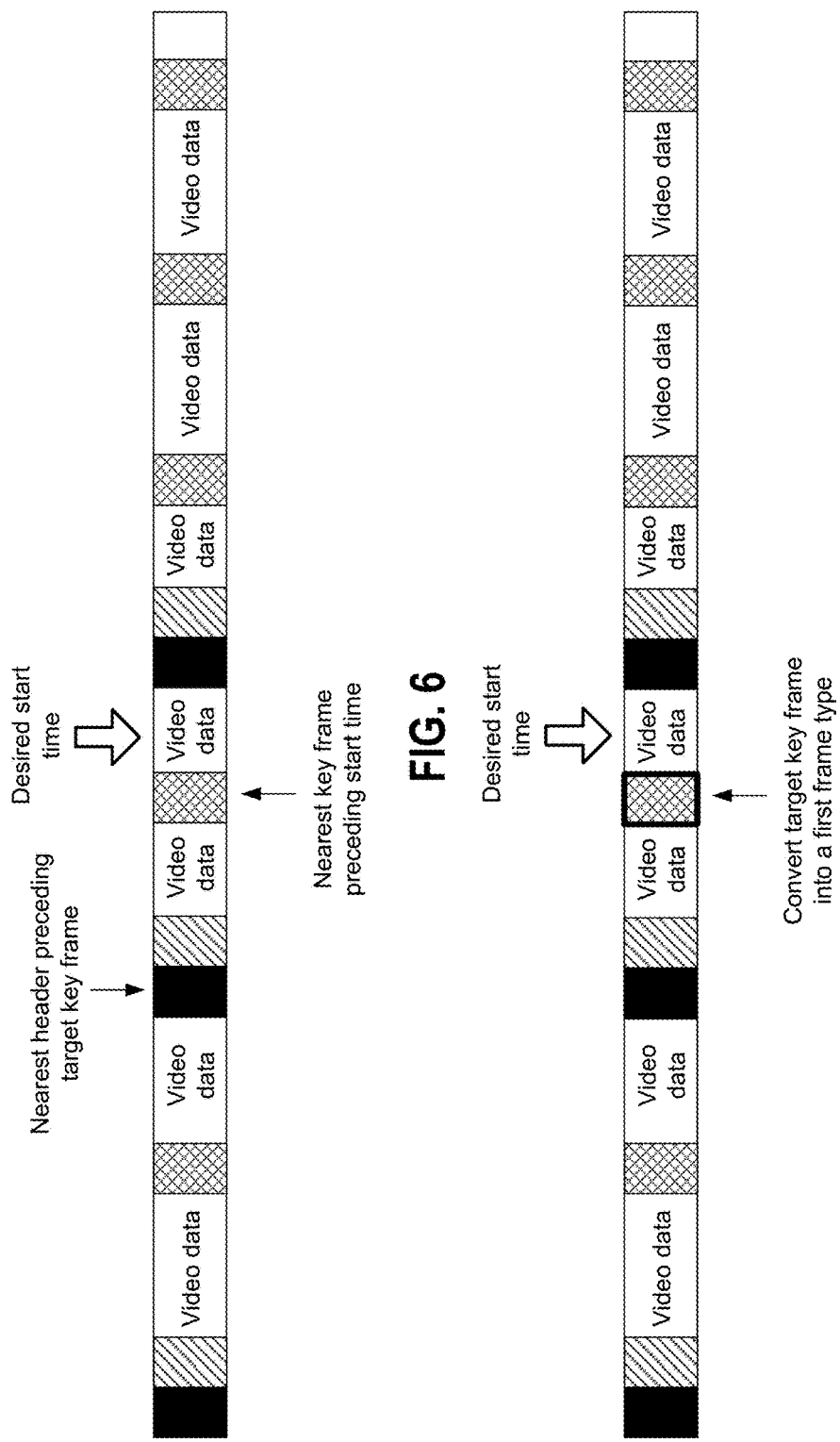

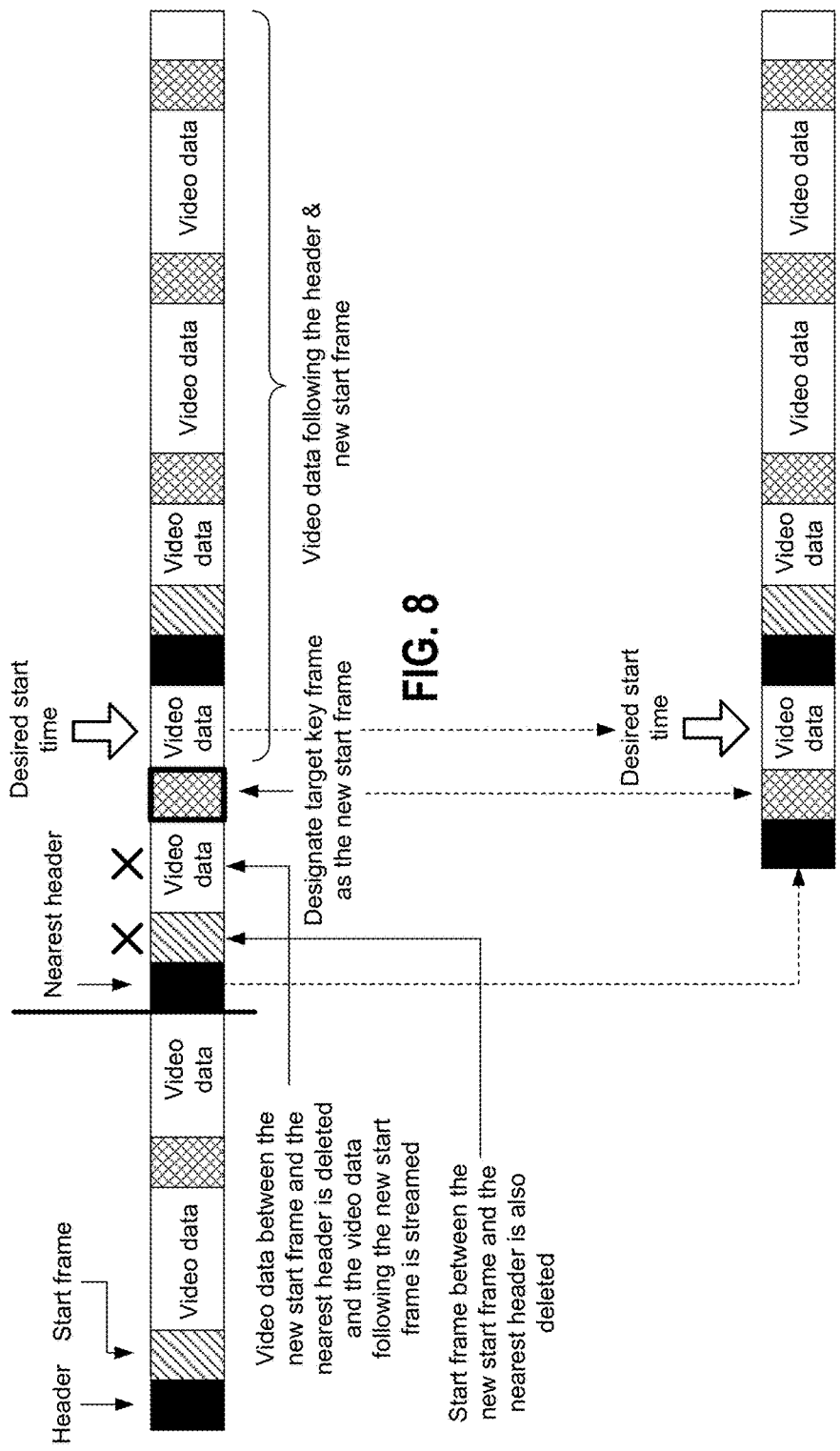

SYSTEMS AND METHODS FOR VIDEO STREAMING BASED ON CONVERSION OF A TARGET KEY FRAME

CROSS-REFERENCE TO RELATED APPLICATION

This application claims priority to, and the benefit of, U.S. Provisional Patent Application entitled, "Systems and Methods for Video Streaming Based on Conversion of a Target Key Frame," having Ser. No. 62/299,589, filed on Feb. 25, 2016, which is incorporated by reference in its entirety.

TECHNICAL FIELD

The present disclosure generally relates to multimedia content and more particularly, to systems and methods for streaming video based on conversion of a target key frame within the video bitstream.

BACKGROUND

As smartphones and other mobile devices have become ubiquitous, people have the ability to stream video content virtually any time. Furthermore, with an ever-growing amount of content available to consumers through the Internet and other sources, consumers have access to a vast amount of digital content. Furthermore, mobile devices can begin playback of content without having to first download the entire video. However, there are perceived shortcomings within conventional streaming techniques.

SUMMARY

Briefly described, one embodiment, among others, is a method implemented in a computing device for streaming a video to a client device. The method comprises transmitting information relating to a video bitstream to a client device, the client device displaying a user interface to a user based on the information relating to the video bitstream. The method further comprises receiving an input signal from the client device indicating a desired start time in the video bitstream, the desired start time specifying a point in the video bitstream to begin streaming. Based on the start time, a target key frame is identified within the video, the target key frame comprising a nearest key frame in the video bitstream preceding the desired start time. The method further comprises identifying a target frame header within the video bitstream, the target frame header comprising a nearest header frame in the video preceding the target key frame and converting the target key frame to a first frame type. The method further comprises sending only the target frame header, the target key frame, and video bitstream that follows the converted target key frame to the client device, wherein an original frame referencing encoded in the video bitstream is utilized, and wherein the client device decodes the video bitstream utilizing the target frame header and the target key frame.

Another embodiment is a system that comprises a memory storing instructions and a processor coupled to the memory. The processor is configured by the instructions to transmit information relating to a video bitstream to a client device, the client device displaying a user interface to a user based on the information relating to the video bitstream. The processor is further configured by the instructions to receive an input signal from the client device indicating a desired start time in the video bitstream, the desired start time specifying a point in the video bitstream to begin streaming. Based on the start time, a target key frame is identified within the video, the target key frame comprising a nearest key frame in the video bitstream preceding the desired start time. The processor is further configured by the instructions to identify a target frame header within the video bitstream, the target frame header comprising a nearest header frame in the video preceding the target key frame and convert the target key frame to a first frame type. The processor is further configured by the instructions to send only the target frame header, the target key frame, and video bitstream that follows the converted target key frame to the client device, wherein an original frame referencing encoded in the video bitstream is utilized, and wherein the client device decodes the video bitstream utilizing the target frame header and the target key frame.

BRIEF DESCRIPTION OF THE DRAWINGS

Various aspects of the disclosure can be better understood with reference to the following drawings. Moreover, in the drawings, like reference numerals designate corresponding parts throughout the several views.

FIG. 4 illustrates various components of a video bitstream.

FIG. 5 illustrates identification of a target key frame based on a desired start point in accordance with various embodiments.

FIG. 6 illustrates identification of a target header based on a desired start point in accordance with various embodiments.

FIG. 7 illustrates conversion of the target key frame into a first frame type in accordance with various embodiments.

FIG. 8 illustrates the content streamer in the computing device streaming the video to the client device in accordance with various embodiments.

FIG. 9 illustrates the client device decoding the received video bitstream using the received target header and target key frame in accordance with various embodiments.

DETAILED DESCRIPTION

Figure 1:
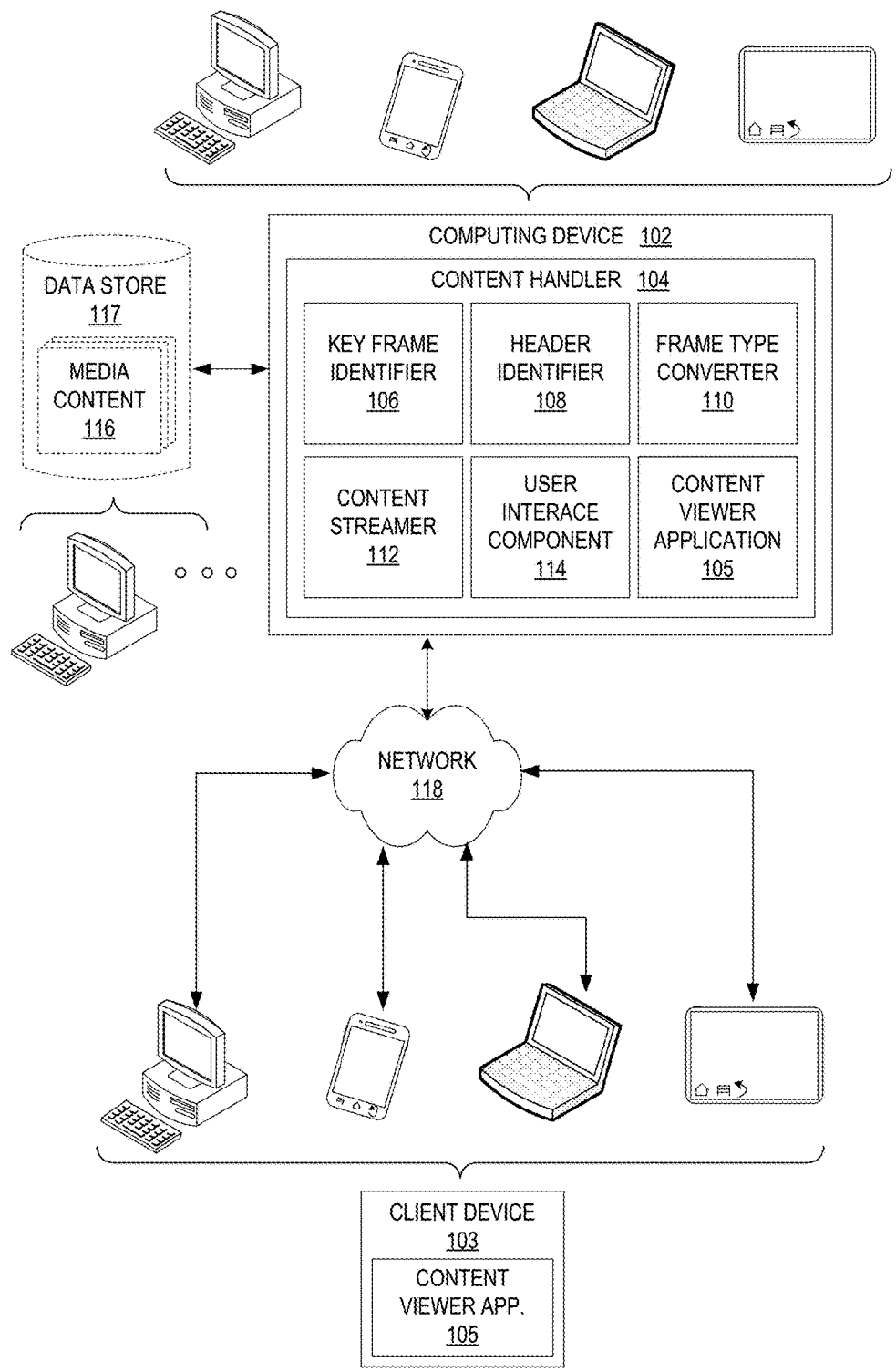
FIG. 1 is a block diagram of a networked environment in which a computing device executes video streaming in accordance with various embodiments.

Conventional systems utilize various techniques for streaming video content to remote devices. A common technique involves streaming an entire source video to the device where the video is being viewed. If the viewer elects to start playback at a point within the video other than at the beginning, the computing device begins streaming at the nearest possible point prior to the desired start point. However, there is generally a delay in viewing the video at the actual desired starting point as the system must first decode video content that precedes the actual desired start point.

Another technique for streaming video involves transcoding the video. One advantage of this technique is that the transcoding is applied to the actual desired start point selected by the user, thereby avoiding the need to stream unwanted portions of the video. The transcoded video is then streamed to the user. However, one perceived shortcoming with this approach is that the transcoding process is computationally intensive and inadequate computing resources may result in delays during the streaming process. Another perceived shortcoming with transcoding is the progressive loss of video quality. Video standards include H.264/AVC, H.265/HEVC, MPEG 2, VP8, VP9, and so on. For purposes of illustration, the following embodiments are based on the H.264/AVC standard. However, it should be noted that different standards/codecs may be implemented into the system while performing the streaming techniques disclosed herein.

The H.264/AVC codec format allows multiple views to be encoded into a single bitstream and introduces inter-view reference to take advantage of the spatial locality of different views. Inter-view prediction involves decoded samples of inter-view reference pictures or inter-view-only reference components for decoding another view component in the same access unit. The H.264/AVC standard for video coding defines a set of prediction mechanisms that include intra-prediction and inter-prediction in which frames in a video bitstream are expressed in terms of one or more neighboring frames. The H.264/AVC standard further comprises bi-directional prediction (B-frame) for advanced compression quality. A typical group of picture (GOP) structure comprises I-frames, B-frames, and P-frames. The I-frame is used to predict the first P-frame and these two frames are also used to predict the first and the second B-frame. The second P-frame is predicted using the first P-frame and they join to predict the third and fourth B-frames.

In order to arrange decoded pictures for prediction, H.264/AVC specifies rules relating to picture ordering in reference lists as well as rules relating to picture reordering for better compression flexibility. Within the H.264/AVC standard, a reference list comprises a list of reference pictures used for inter prediction of a P, B, or SP slice. As defined in the H.264/AVC standard, a slice relates to an integer number of macroblocks or macroblock pairs ordered consecutively in the raster scan within a particular slice group. The macroblock addresses are derived from the first macroblock address in a slice, as represented in the slice header, and the macroblock to slice group map. A slice header relates to a part of a coded slice containing the data elements relating to the first or all macroblocks represented in the slice.

Various embodiments are disclosed for systems and methods for streaming video whereby the spacing between the nearest appropriate start point to the actual desired start point is reduced, thereby improving the user experience by reducing any latency that may occur during decoding process. Compared to conventional streaming techniques, the nearest appropriate start point in accordance with various embodiments is generally closer to the actual desired start point. A description of a system for implementing video streaming is now described followed by a discussion of the operation of the components within the system.

FIG. 1 is a block diagram of a networked environment in which a computing device 102 and one or more client devices 103 are communicatively coupled via a network 118. Each of the client devices 103 is configured to submit a streaming request to the computing device 102 and to receive streaming video from the computing device 102. The computing device 102 comprises a system with both computing capability and storage of media content. As an alternative to a single computing device 102, a plurality of computing devices 102 may alternatively be employed that are arranged, for example, in one or more computing device 102 banks or computer banks or other arrangements. For example, a plurality of computing devices 102 may collectively comprise a cloud computing resource and/or any other distributed computing arrangement, where such computing devices 102 may be located in a single installation or may be distributed among different geographical locations.

The client devices 103 may be embodied, for example, as a desktop computer, computer workstation, laptop, smartphone, tablet, or other computing system with display capability. For example, the client devices 103 may comprise a display device such as a smart TV or other device with similar video streaming capabilities. In other embodiments, the client devices 103 may be embodied as a video gaming console, which includes a video game controller for receiving user input. For such embodiments, the video gaming console may be connected to a television or other display.

A content handler 104 executes on a processor of the computing device 102 and configures the processor to perform various operations, as described in more detail below. The content handler 104 retrieves media content 116 from a data store 117 and processes the retrieved media content 116, as described in more detail below. As shown, the data store 117 may be implemented on a separate computing device 102. Alternatively, the data store 117 may be implemented within the computing device 102.

The content handler 104 comprises various components for processing the retrieved media content 116, where such components include a key frame identifier 106, a header identifier 108, a frame type converter 110, and a content streamer 112. The content handler 104 further comprises a user interface component 114 for facilitating the rendering of user interfaces on client devices 103. The user interfaces are rendered on the display of client devices 103 for receiving an input signal indicating the desired start points in videos and for displaying playback of streaming video.

A content viewer application 105 executes on the client devices 103 and/or computing device 102 and allows the user to specify desired start time(s) and responsive to the specified start time(s), view streaming video sent by the computing device 102. In this regard, the user interface can be displayed on a computing device 102 and/or the client devices 103. In some embodiments, the client devices 103 are utilized primarily for displaying streaming video. Thus, a user can specify the desired start time via either device. For example, in one implementation, the computing device 102 can be embodied as a personal computer and provides a user interface that allows the user to specify a desired start time. In another implementation, the client device 103 can be embodied as a television that displays a user interface, where the user can specify a desired start time using a remote controller or other device.

Figure 2:
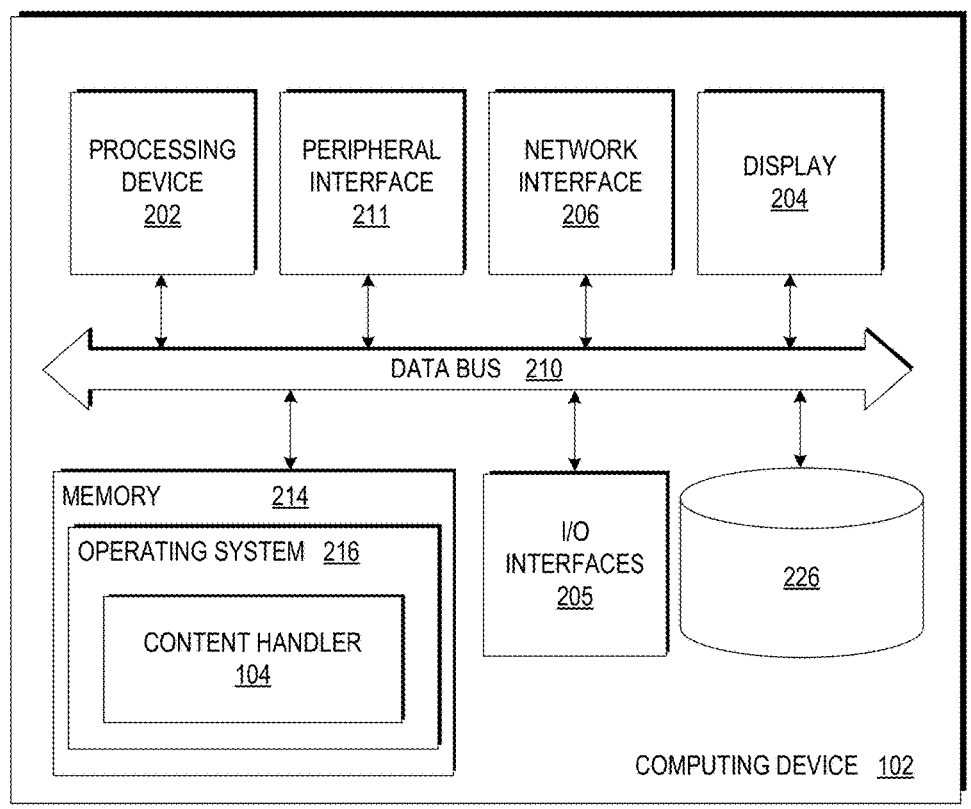
FIG. 2 illustrates a schematic block diagram of the computing device in FIG. 1 in accordance with various embodiments.

FIG. 2 illustrates a schematic block diagram of the computing device 102 in FIG. 1. The computing device 102 may be embodied in any one of a wide variety of wired and/or wireless computing devices 102, such as a desktop computer, portable computing device, and so forth. As discussed above, a plurality of computing devices 102 may alternatively be employed that are arranged, for example, in one or more computing device 102 banks or computer banks or other arrangements. As shown in FIG. 2, each of the computing device 102 comprises memory 214, a processing device 202, a number of input/output interfaces 205, a network interface 206, a display 204, a peripheral interface 211, and mass storage 226, wherein each of these components are connected across a local data bus 210.

The processing device 202 may include any custom made or commercially available processor, a central processing unit (CPU) or an auxiliary processor among several processors associated with the computing device 102, a semiconductor based microprocessor (in the form of a microchip), a macroprocessor, one or more application specific integrated circuits (ASICs), a plurality of suitably configured digital logic gates, and other well known electrical configurations comprising discrete elements both individually and in various combinations to coordinate the overall operation of the computing system.

The memory 214 can include any one of a combination of volatile memory elements (e.g., random-access memory (RAM, such as DRAM, and SRAM, etc.)) and nonvolatile memory elements (e.g., ROM, hard drive, tape, CDROM, etc.). The memory 214 typically comprises a native operating system 216, one or more native applications, emulation systems, or emulated applications for any of a variety of operating systems and/or emulated hardware platforms, emulated operating systems, etc. For example, the applications may include application specific software which may comprise some or all the components of the computing device 102 depicted in FIG. 1. In accordance with such embodiments, the components (such as the content handler 104 and accompanying components in FIG. 1) are stored in memory 214 and executed by the processing device 202. One of ordinary skill in the art will appreciate that the memory 214 can, and typically will, comprise other components which have been omitted for purposes of brevity.

Input/output interfaces 205 provide any number of interfaces for the input and output of data. For example, where the computing device 102 comprises a personal computer, these components may interface with one or more user input/output interfaces 205, which may comprise a keyboard or a mouse, as shown in FIG. 2. The display 204 may comprise a computer monitor, a plasma screen for a PC, a liquid crystal display (LCD) on a hand held device, a touchscreen, or other display device.

In the context of this disclosure, a non-transitory computer-readable medium stores programs for use by or in connection with an instruction execution system, apparatus, or device. More specific examples of a computer-readable medium may include by way of example and without limitation: a portable computer diskette, a random access memory (RAM), a read-only memory (ROM), an erasable programmable read-only memory (EPROM, EEPROM, or Flash memory), and a portable compact disc read-only memory (CDROM) (optical).

Figure 3:
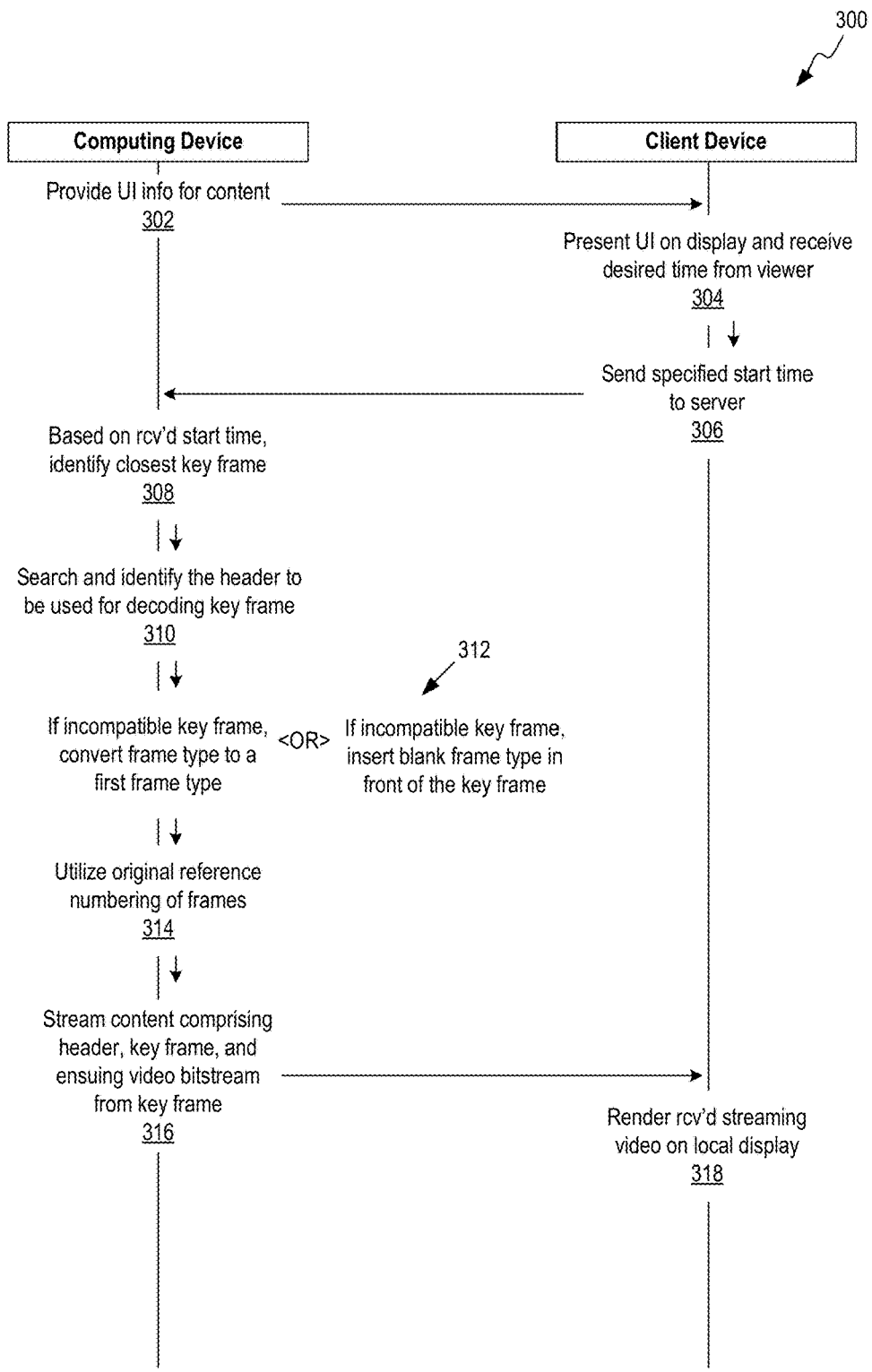
FIG. 3 illustrates the process flow between the computing device and the client device of FIG. 1 in accordance with various embodiments.

FIG. 3 illustrates the process flow between the computing device 102 and a client device 103 of FIG. 1 in accordance with various embodiments. It is understood that the flowchart 300 of FIG. 3 provides merely an example of the different types of functional arrangements that may be employed to implement the operation of the various components of the computing device and the client device 103. As an alternative, the flowchart 300 of FIG. 3 may be viewed as depicting an example of steps of a method implemented in the computing device 102 or the client device 103 according to one or more embodiments.

Although the flowchart 300 of FIG. 3 shows a specific order of execution, it is understood that the order of execution may differ from that which is depicted. For example, the order of execution of two or more blocks may be scrambled relative to the order shown. Also, two or more blocks shown in succession in FIG. 3 may be executed concurrently or with partial concurrence. It is understood that all such variations are within the scope of the present disclosure.

To begin, at step 302, the computing device 102 retrieves media content 116 comprising a video from a data store 117 and sends user interface data relating to the video to the client devices 103. At step 304, the client devices 103 displays the user interface based on the user interface data. At step 306, a user of the client device 103 then specifies a desired start time in the video for playback, where the desired start time may comprise any point in the video. At step 306, the client devices 103 sends the desired start time to the computing device 102.

At step 308, based on the received start time, the key frame identifier 106 in the computing device 102 identifies a closest key frame preceding the desired start. To illustrate, reference is made to FIGS. 4 and 5. FIG. 4 illustrates various components in a video bitstream. As shown, the video bitstream includes such fields as a header, a start frame, video data, and a key frame. As shown in FIG. 5, a target key frame comprises a nearest key frame preceding the specified start time.

Referring back to FIG. 3, the process proceeds to step 310, where the header identifier 108 in the computing device 102 searches and identifies the header to be used for decoding the target key frame. To illustrate, reference is made to FIG. 6, which shows the location of the target key frame. The header identifier 108 in the computing device 102 processes the video bitstream and identifies a nearest target header that precedes the target key frame identified in step 308.

Reference is made back to FIG. 3. In step 312, if the target key frame designated by the frame searcher is not a compatible key frame that can be used as the start point for streaming purposes, the frame type converter 110 converts the key frame to a first frame type, as shown in FIG. 7. The first frame type specifies a frame in the video in which no frame after the first frame type references any frame preceding the first frame type. This allows the first frame type to serve as a new start frame corresponding to the starting point for streaming purposes.

An incompatible frame refers to a frame type that requires prior decoding of another frame (e.g., an I-frame or P-frame) in order to be decoded. For some embodiments, if the target key frame is an I-frame, the frame type converter 110 in the computing device 102 may be configured to convert the I-frame to an Instantaneous Decoding Refresh (IDR) frame (as defined in the H.264/AVC and HEVC video coding standards), where the IDR is a type of I-frame where no frame after the IDR frame refers to any frame preceding the IDR frame. Conversion of the I-frame to an IDR frame facilitates random access within the video so that playback can start on an IDR frame. In other embodiments, the frame type converter 110 may be configured to insert a blank frame comprising an IDR frame in front of the target key frame. In the other embodiments, if the target key frame is an inter coded frame (e.g., a B-frame or a P-frame), the frame type converter 110 directly converts the target key frame to the first frame type (e.g., IDR frame).

In step 314, the original reference number of frames is preserved and utilized during the streaming process. Specifically, rather than modifying the reference list, the content handler 104 reuses the original reference list for frame referencing during the streaming process. In step 316, content that comprises only the header, key frame, and video bitstream that follows the key frame is streamed. To illustrate, reference is made to FIG. 8. As shown, the content streamer 112 in the computing device 102 begins streaming the video to the client devices 103, where the content handler 104 sends the target header, followed by the target key frame and the remaining components of the video bitstream following the target header to the client device 103 that specified the desired start time.

Note that as shown in FIG. 8, the start frame and the video data between the nearest header and the new start frame are not sent to the client device 103 (or in some implementations, deleted), and only the target header, the new start frame, and the video data following the new start frame is sent to the client device 103. In this regard, the portion of the video bitstream prior to the target header is not sent to the client device 103. Referring back to FIG. 3, the process proceeds to step 318, where the client device 103 that specified the desired start time displays the streaming video on a local display. Specifically, with reference to FIG. 9, the client device 103 decodes the received video bitstream using the received target header and target key frame.

Figure 10:
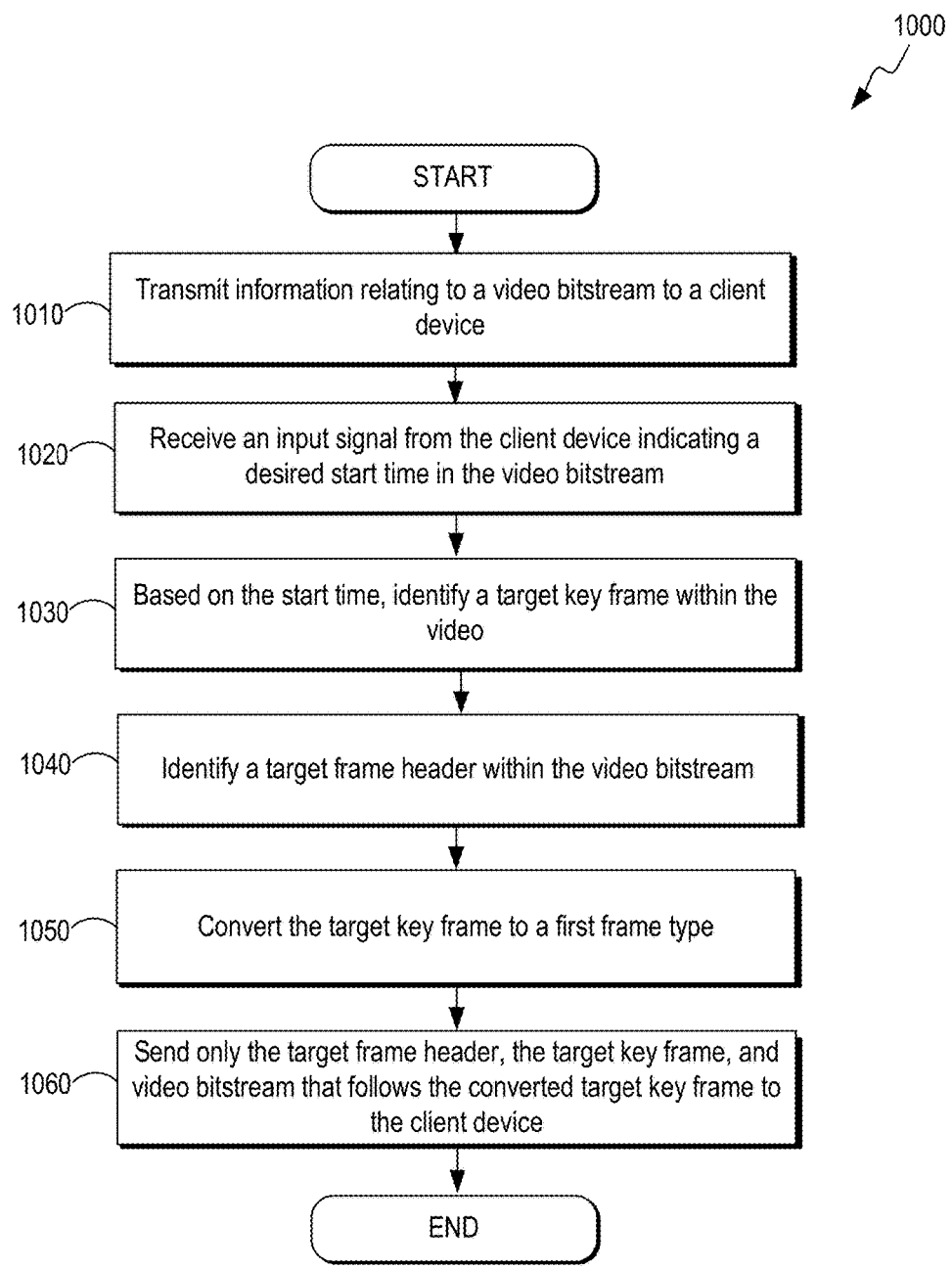
FIG. 10 is a flowchart for processing and streaming a video bitstream to a client device performed by the computing device of FIG. 1 in accordance with various embodiments.

Reference is made to FIG. 10, which is a flowchart 1000 in accordance with an embodiment for processing and streaming a video bitstream performed by the computing device 102 of FIG. 1. It is understood that the flowchart 1000 of FIG. 10 provides merely an example of the different types of functional arrangements that may be employed to implement the operation of the various components of the computing device 102. As an alternative, the flowchart 1000 of FIG. 10 may be viewed as depicting an example of steps of a method implemented in the computing device 102 according to one or more embodiments.

Although the flowchart 1000 of FIG. 10 shows a specific order of execution, it is understood that the order of execution may differ from that which is depicted. For example, the order of execution of two or more blocks may be scrambled relative to the order shown. Also, two or more blocks shown in succession in FIG. 10 may be executed concurrently or with partial concurrence. It is understood that all such variations are within the scope of the present disclosure.

In block 1010, information relating to a video bitstream is transmitted to a client device 103, and the client device 103 displays a user interface to a user based on the information relating to the video bitstream. The information can comprise metadata associated with the video bitstream such as the total playback time of the video bitstream, descriptive information, and so on.

In block 1020, an input signal is received from the client device indicating a desired start time in the video bitstream, where the desired start time specifies a point in the video bitstream to begin streaming. For some implementations, the user interface described above can include a timeline component to facilitate selection of the desired start time by the user. The timeline component can include other components such as thumbnail graphics corresponding to frames within the video bitstream.

In block 1030, a target key frame is identified within the video based on the start time. The target key frame comprises a nearest key frame in the video bitstream preceding the desired start time, as shown, for example, in FIG. 6. In block 1040, a target frame header is identified within the video bitstream, where the target frame header comprises a nearest header frame in the video preceding the target key frame.

In block 1050, the target key frame is converted to a first frame type. In some implementations, this conversion is performed if the target key frame is an inter coded frame (e.g., a B-frame, P-frame). As previously described, the I-frame can also be converted to a first frame type (e.g., IDR frame). In block 1060, only the target frame header, the target key frame, and video bitstream that follows the converted target key frame is sent to the client device, where the client device then decodes the video bitstream utilizing the target frame header and the target key frame. In some implementations, the original frame referencing encoded in the video bitstream is utilized. Thereafter the process ends.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

At least the following is claimed:

1. A method implemented in a computing device for streaming a video to a client device, wherein the video comprises at least one key frame, the method comprising:
   transmitting information relating to a video bitstream to a client device, the client device displaying a user interface to a user based on the information relating to the video bitstream;
   receiving an input signal from the client device indicating a desired start time in the video bitstream, the desired start time specifying a point in the video bitstream to begin streaming;
   based on the start time, identifying a target key frame within the video bitstream, the target key frame comprising a nearest key frame in the video bitstream preceding the desired start time;
   identifying a target frame header within the video bitstream, the target frame header comprising a nearest header frame in the video preceding the target key frame;
   converting the target key frame to a first frame type;
   determining whether any video data is located between the target frame header and the target key frame;
   based on the determination, removing any video data located between the target frame header and the target key frame; and
   sending only the target frame header, the target key frame, and video bitstream that follows the converted target key frame to the client device, wherein an original frame referencing encoded in the video bitstream is utilized, and wherein the client device decodes the video bitstream utilizing the target frame header and the target key frame.

2. The method of claim 1, wherein any start frame located between the target frame header and the target key frame is not sent to the client device.

3. The method of claim 1, wherein converting the target key frame to the first frame type is performed if the target key frame is an inter coded frame.

4. The method of claim 3, wherein the inter coded frame is a B-frame or a P-frame.

5. The method of claim 1, wherein the key frame comprises an I-frame.

6. The method of claim 1, wherein the target key frame is converted to the first frame type such that the first frame type specifies a frame in the video bitstream in which no frame after the first frame type references any frame preceding the first frame type.

7. The method of claim 1, where the first frame type comprises an Instantaneous Decoding Refresh (IDR) frame type in accordance with the H.264 standard.

8. The method of claim 1, wherein the computing device comprises one of: a server, PC, notebook and mobile device, and wherein the client device comprises a display device.

9. A method implemented in a computing device for streaming a video to a client device, wherein the video comprises at least one key frame, the method comprising:
transmitting information relating to a video bitstream to a client device, the client device displaying a user interface to a user based on the information relating to the video bitstream;
receiving an input signal from the client device indicating a desired start time in the video bitstream, the desired start time specifying a point in the video bitstream to begin streaming;
based on the start time, identifying a target key frame within the video bitstream, the target key frame comprising a nearest key frame in the video bitstream preceding the desired start time;
identifying a target frame header within the video bitstream, the target frame header comprising a nearest header frame in the video preceding the target key frame;
inserting a blank frame directly preceding the target key frame, wherein inserting the blank frame directly preceding the target key frame is performed if the target key frame is an inter coded frame, wherein the blank frame comprises a first frame type;
determining whether any video data is located between the target frame header and the target key frame;
based on the determination, removing any video data located between the target frame header and the target key frame; and
sending only the target frame header, the target key frame, and video bitstream that follows the target key frame to the client device, wherein an original frame referencing encoded in the video bitstream is utilized, and wherein the client device decodes the video bitstream utilizing the target frame header and the target key frame.

10. The method of claim 9, wherein the first frame type comprises a frame in the video bitstream in which no frame after the first frame type references any frame preceding the first frame type.

11. A system, comprising:
a memory storing instructions; and
a processor coupled to the memory and configured by the instructions to at least:
transmit information relating to a video bitstream to a client device, the client device displaying a user interface to a user based on the information relating to the video bitstream;
receive an input signal from the client device indicating a desired start time in the video bitstream, the desired start time specifying a point in the video bitstream to begin streaming;
based on the start time, identify a target key frame within the video bitstream, the target key frame comprising a nearest key frame in the video bitstream preceding the desired start time;
identify a target frame header within the video bitstream, the target frame header comprising a nearest header frame in the video preceding the target key frame;
convert the target key frame to a first frame type;
determine whether any video data is located between the target frame header and the target key frame;
based on the determination, remove any video data located between the target frame header and the target key frame; and
send only the target frame header, the target key frame, and video bitstream that follows the converted target key frame to the client device, wherein an original frame referencing encoded in the video bitstream is utilized, and wherein the client device decodes the video bitstream utilizing the target frame header and the target key frame.

12. The system of claim 11, wherein any start frame located between the target frame header and the target key frame is not sent to the client device.

13. The system of claim 11, wherein the processor converts the target key frame to the first frame type if the target key frame is an inter coded frame.

14. The system of claim 13, wherein the inter coded frame is a B-frame or P-frame.

15. The system of claim 11, wherein the key frame comprises an I-frame.

16. The system of claim 11, wherein the target key frame is converted to the first frame type such that the first frame type specifies a frame in the video bitstream in which no frame after the first frame type references any frame preceding the first frame type.

17. The system of claim 11, where the first frame type comprises an Instantaneous Decoding Refresh (IDR) frame type in accordance with the H.264 standard.

18. A non-transitory computer-readable storage medium storing instructions to be implemented by a computing device having a processor, wherein the instructions, when executed by the processor, cause the computing device to at least:
transmit information relating to a video bitstream to a client device, the client device displaying a user interface to a user based on the information relating to the video bitstream;
receive an input signal from the client device indicating a desired start time in the video bitstream, the desired start time specifying a point in the video bitstream to begin streaming;
based on the start time, identify a target key frame within the video bitstream, the target key frame comprising a nearest key frame in the video bitstream preceding the desired start time;
identify a target frame header within the video bitstream, the target frame header comprising a nearest header frame in the video preceding the target key frame;
convert the target key frame to a first frame type;
determine whether any video data is located between the target frame header and the target key frame;
based on the determination, remove any video data located between the target frame header and the target key frame; and
send only the target frame header, the target key frame, and video bitstream that follows the converted target key frame to the client device, wherein an original frame referencing encoded in the video bitstream is utilized, and wherein the client device decodes the video bitstream utilizing the target frame header and the target key frame.

19. The non-transitory computer-readable storage medium of claim 18, wherein, wherein the processor converts the target key frame to the first frame type if the target key frame is an inter coded frame.

20. The non-transitory computer-readable storage medium of claim 19, wherein the key frame comprises an I-frame type.

21. The non-transitory computer-readable storage medium of claim 18, wherein the target key frame is converted to the first frame type such that the first frame type specifies a frame in the video bitstream in which no frame after the first frame type references any frame preceding the first frame type.

22. The non-transitory computer-readable storage medium of claim 18, where the first frame type comprises an Instantaneous Decoding Refresh (IDR) frame type in accordance with the H.264 standard.

\* \* \* \* \*